July 21, 1970   O. G. A. LIDEN   3,521,582
HEATING APPARATUS

Filed March 26, 1968   3 Sheets-Sheet 1

INVENTOR
Gunnar August Liden
BY
Attorney

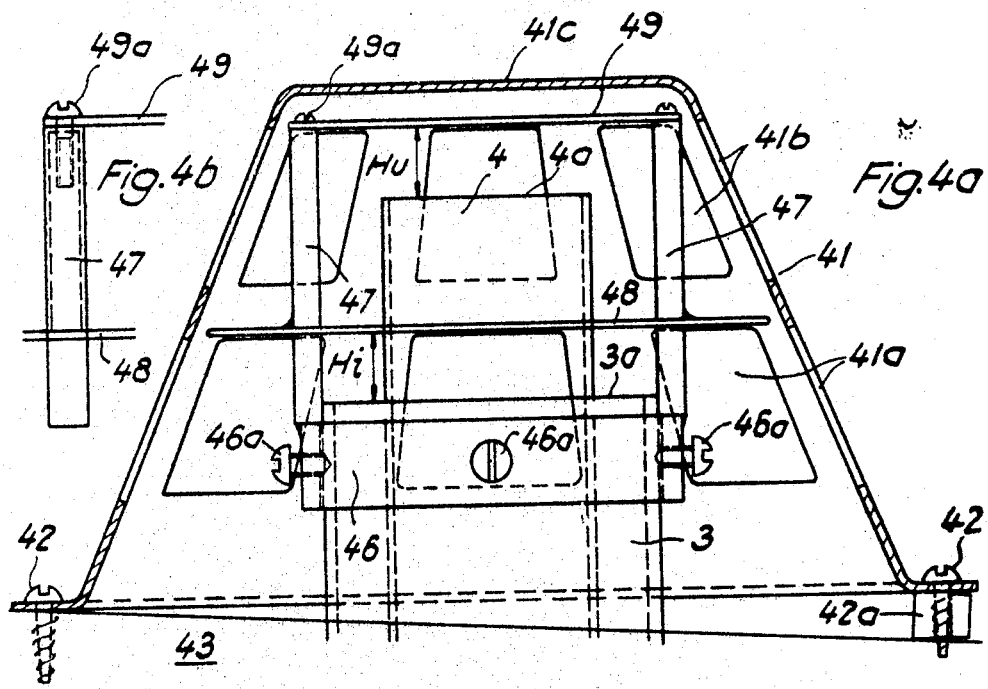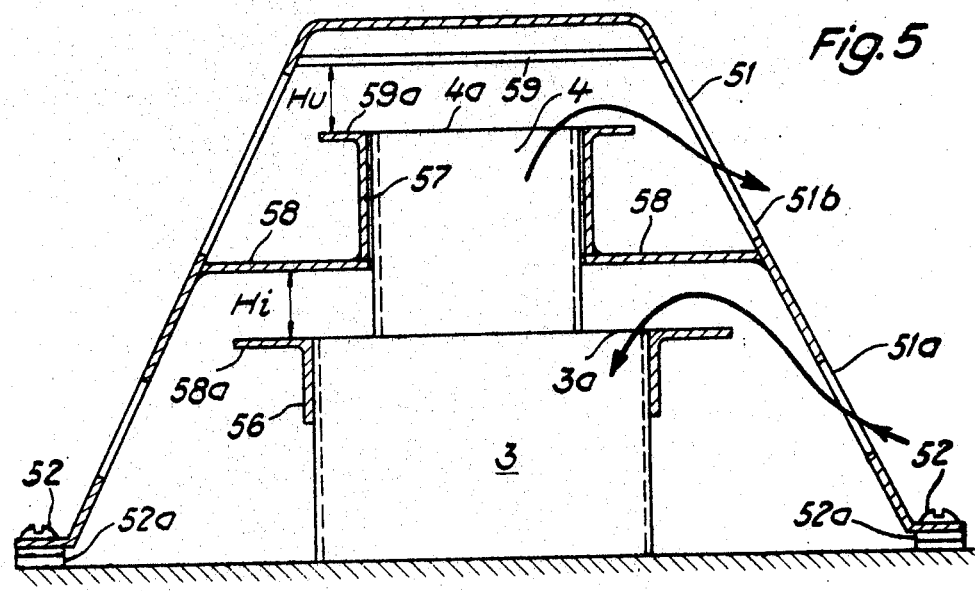

United States Patent Office 3,521,582
Patented July 21, 1970

3,521,582
HEATING APPARATUS
Odd Gunnar August Liden, Hagersten, Sweden; Karin Elonora Liden, Odd Hakan Liden, and Kajsa Margaretha Liden, the sole heirs of said Odd Gunnar August Liden, deceased, assignors to Liden Varme AB, Norrfjarden, Sweden
Filed Mar. 26, 1968, Ser. No. 716,071
Int. Cl. F23l *17/04*
U.S. Cl. 110—147     4 Claims

ABSTRACT OF THE DISCLOSURE

A device for regulating the air intake as well as the exhausting gases in order to get a heating apparatus working with high efficiency. A number of different embodiments are shown but each of them is constructed so the air intake as well as the exhausting gases may be regulated at the same time. This is achieved by the fact that the tube for the air intake and the tube for the exhausting gases are arranged so that differences in the atmospheric pressure act equally upon both tube openings.

---

The present invention generally relates to heating apparatus and more particularly to a device for a heating apparatus intended to control and adjust the air intake as well as the air outlet in order to be highly efficient.

The heating apparatus used in connection to the present invention is particularly adapted for use in tents, caravans, work vans, busses, huts, barracks, cottages, boats and other localities.

The primary object of the present invention is to provide a heating apparatus, in which the air intake in the form of a tube is arranged concentrically in respect to the air outlet tube, with a possibility to regulate or modify the air intake as well as the air outlet at the same time.

A still further object of the present invention is to provide a heating apparatus of the kind referred to in which all requisite air is induced directly from the external atmosphere and in which all the gases of combustion are vented directly to the external atmosphere whereby the air present within the locality will not be consumed, nor mixed up with gases of combustion.

A still further object is to provide a heating apparatus of the kind referred to, which will function perfectly when operating in moving crafts such as boats or vans, and also under severe weather conditions or in heavy seas where otherwise the burner of the apparatus would tend to become extinguished by a gust of wind or by intruding water. A specific object of the invention is to prevent such mal-functioning and, at the same time, to impart to the heating apparatus a stabile draft effect and to enable one single opening to be made in the roof for the induction of air and for exhausting gases of combustion through a chimney having two passages, one for the air intake, and one for the combustion gases, respectively.

The heating apparatus according to the present invention is so devised and constructed as to meet all the objects stated hereinbefore, and in addition, so as to be readily provided with a safety device adapted automatically to cut off the fuel supply if the burner should become extinguished for some reason or another, and also with a thermostatic device adapted automatically to control the fuel supply so as to maintain constantly a desired room temperature.

Figure 1:
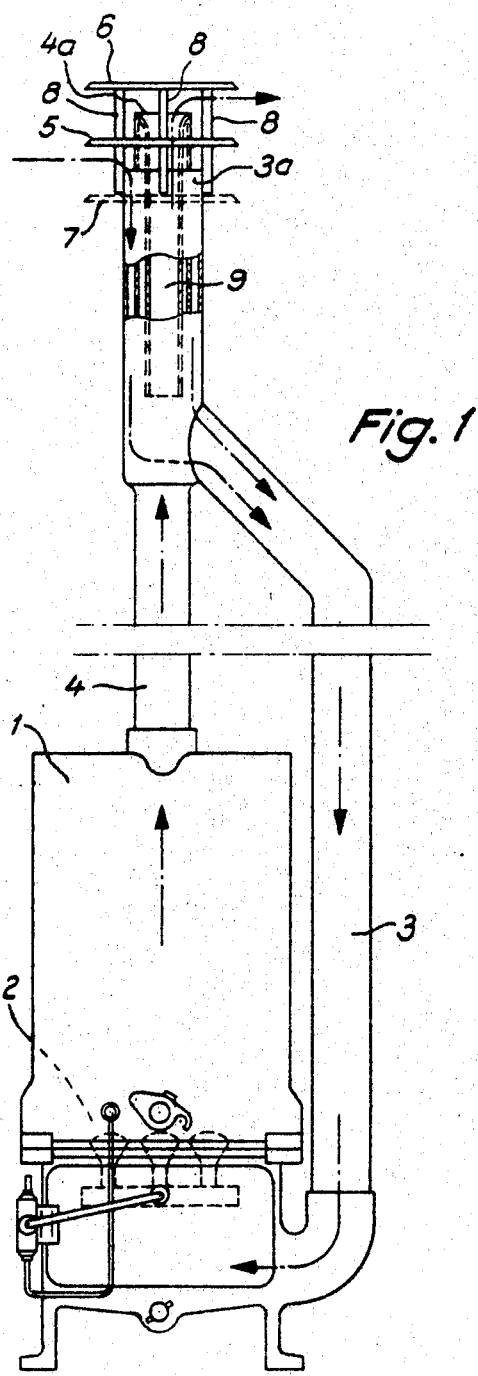
Figure 2:
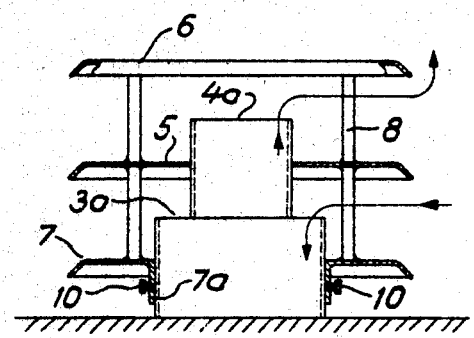
Figure 3:
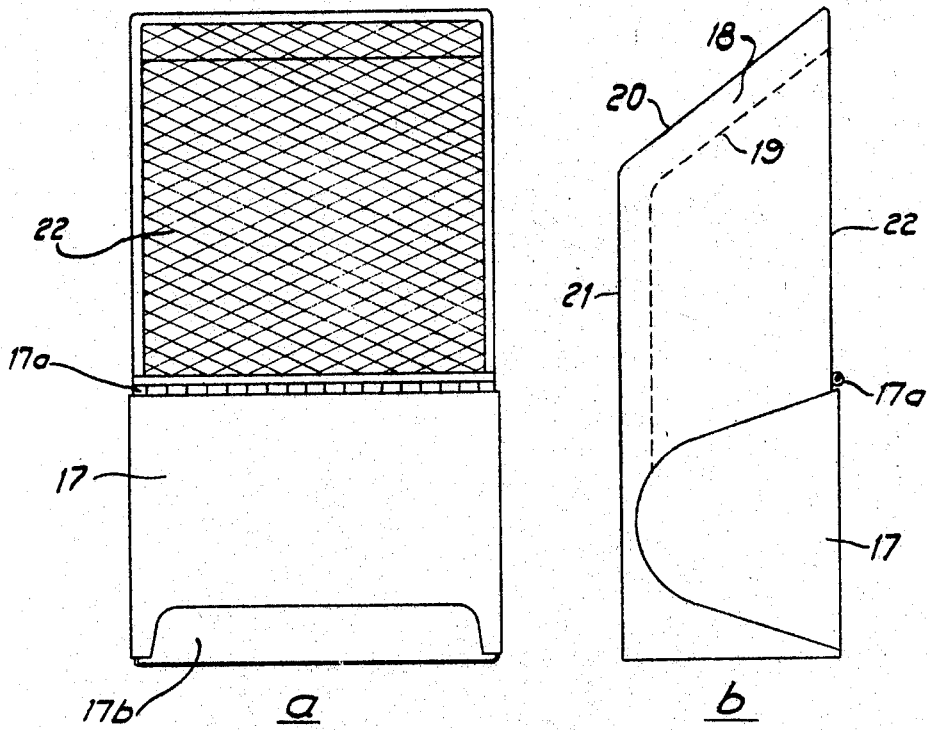

A few embodiments of the invention will now be described by way of example, reference being had to the accompanying drawings, in which;

FIG. 1 is a front elevation veiw of a preferred heating apparatus with a device according to the present invention, FIG. 2 is a view of the top portion of an air intake and an air outlet tube or channel exemplifying the main principle of a balanced-draft design, FIG. 3a–c state different views of a casing or housing intended to cover the heating apparatus, FIG. 4a is a front-elevation view of a preferred hood or cowl, FIG. 4b is a part of the hood according to FIG. 4a and FIG. 5 is another preferred embodiment of a hood or cowl.

In FIG. 1 there is shown at 1 a heating apparatus essentially of the type described in the U.S. patent specification 2,852,017, dated Sept. 16, 1959, which heating apparatus has a combustion chamber 2. Said chamber 2 communicates with a first channel or tube 3 intended for air inlet and a second channel or tube 4 intended for exhausting gases or even called air outlet. One or more in the heating apparatus arranged burner devices are intended for burning gaseous or atomized fuel. The first tube 3 and the second tube 4 are, as mentioned above, connected to the combustion chamber 2 and their free ends 3a, 4a, respectively, are placed or arranged adjacent each other. Such an arrangement causes that differences in the atmospheric pressure act on the two free ends 3a, 4a, respectively, essentially the same. The two free ends 3a, 4a, respectively, cooperate with at least one perpendicular to a central line of the tubes arranged with circular discs. The disc which belongs to or is intended to cooperate with the free end 3a of the tube 3 has the reference number 5 and the disc which belongs to or is intended to cooperate with the free end 4a of the tube 4 has the reference number 6.

The upper part of the first tube 4 has a greater diameter than that of the tube 3 and is arranged to surround the upper part of the second channel 3 concentrically. It is recommended that the concentrically arranged parts have a length decreasing such a length of the parts, which gives sufficiently high temperature of the combustion gases in order to eliminate condensation on the inner side of the second tube 3. At the long concentrically adapted parts the combustion gases will be dampened or cooled down and this causes condensation on the inner side of the tube 4. Such a disadvantage may be eliminated as will be described more in detail hereinafter.

Each of the discs 5 and 6 serves as a roof for the free ends of the tubes 3, 4, respectively, and may have a circular and a plane or flat form. The disc 5 has a central hole, through which the tube 4 passes. The disc 6, intended to cover the free end 4a of the tube 4 or the upper disc, prevents rain from falling down into the tube 4 as well as into the tube 3. However tube 3 cooperates with disc 5, which together with disc 6 and an additional disc 7 results in the same atmospheric pressure being achieved at the openings 3a and 4a of the tube 3 and the tube 4. Moreover the disc 5 serves as a protection against rain or the like tending to fall down into tubes 4, but an essential object is to prevent the exhausting gases from being mixed with the fresh air. Furthermore it is often desirable that the free end or the opening 3a of the tube 3 be provided with an additional disc 7 for a reason, which will be described more in detail hereinafter. This disc 7 may be arranged at a distance to disc 5 equal to the distance between disc 5 and disc 6. Especially during hard working conditions it is necessary to so arrange said disc 7, because it is by such conditions necessary to eliminate vertical movements of the air stream.

As will be seen from FIG. 1 and FIG. 2 the two discs 5, 6 respectively and eventually also the disc 7 are connected together by specially designed connecting means, causing very little turbulence in the horizontal air movements passing by said connecting means. This can be accomplished by giving the connecting means 8 a curved design.

According to the main feature of the present invention at least two of the discs are connected to each other and movable as a unit along an axis parallel to the tubes 3 and 4. The distance between the free end 3a of the tube 3 and the disc 5 may be adjusted so, that this distance is equal to the distance between the free end 4a of the tube 4 and the disc 6. Of essential importance is the fact, that the number of discs 5, 6 or 7 and the distance between each other are choosen so, that essentially the same atmospheric pressure is achieved at the free ends 3a, 4a of the tubes 3, 4, respectively. The number of discs and the distance between them is easily ascertained by experiments in the field.

If the installation of the plant makes it necessary to have the tube 3 surround the tube 4, adjacent to the free ends, such a length that said length exceeds the length which permits enough high temperature of the exhausting gases at full heat development to eliminate condensation on the inside of the channel, the temperature of the exhausting gases will be lower than the condensation value. In such a case it is suggested that the tube 4 will surround an additional channel or tube 9. Said tube 9 will serve as a protection towards a cooling of the gases under said condensation value and thereby it is possible to eliminate condensation even in such a case. It is clear from FIG. 1 how the tube 9 is connected to the upper open part of the tube 4.

It has been verified practically that it is suitable to use a dimension rule, in order to bring about a balanced-draft design which may be adapted to any installed plant independently of their position, that the diameter of the discs may exceed the diameter of tube 4, and that the distance between two adjacent discs, as an example disc 5 and 6, essentially is equal to the outer diameter of the tube 4. Another dimension rule is that the inner diameter of the tube 4 may exceed half the outer diameter of the tube 3. A suitable value for disc 5 and disc 6 is that the free end 4a of the tube 4 shall be arranged in the middle of the discs. However according to the invention these discs and their positions may be varied and therefore it is obvious that this value may vary within adjacent ranges, depending upon the design of the discs and which heating apparatus is used.

FIG. 2 shows a suitable construction according to the invention in which the atmospheric pressure acting on the free ends 3a and 4a may be adjusted. This is achieved by a construction where a third disc 7 carries two or more connecting means 8 for the discs 5 and 6. By forming the disc 7 with a lip 7a or a cylinder surrounding the free end 3a of the tube 3 and to arrange in this lip 7a a plurality of threaded holes, intended to cooperate with corresponding screws 10, it is possible to move the unit along a central axis for the tube 3 very easily. FIG. 2 also shows how the outer part of each disc is provided with a downwardly facing lip.

FIGS. 3a–3c shows a suitable housing for the heating apparatus in three different projections. The entire housing may be constructed of aluminum plate or the like.

In FIG. 3a 17 indicates a door, which is turnable around a horizontally arranged hinge 17a. The door 17 has a bent flange turned towards one of the sides of the housing. This flange together with the front face of the door covers a hole in the housing. Through said hole it is possible to actuate parts arranged onto the heating apparatus intended to be placed inside said housing. In FIG. 3c shows that the top plate of the housing has two circular holes 20a, intended for the two tubes 3 and 4 connected to the heating apparatus. The upper front part of the housing is provided with a screen 22.

When the heating apparatus is working and it is placed inside said housing the heat may directly radiate out through said screen 22. The heat may also be reflected from the inner wall 19, which is made out of aluminum or the like. The wall 19 and the wall 20, 21 form a channel 18 between them, about 3 cm. deep and having a breadth equal to the breadth of the housing at the rear part of the housing. Thus the rear wall of the housing is made of one bent plate 20, 21 (see FIG. 3b). The rear surface, the surface facing the plates 20, 21, at the wall 19 will be cooled by air passing in the direction from the floor, through an opening 17b in the door 17 and through said channel 18. The side of the wall 19, which is facing the screen 22 will also be cooled by an air stream passing through the opening 17b in the door 17 and between the heating apparatus and the wall 19 and out through said screen 22. If the material in the wall 19 has good reflecting properties (aluminium or the like) this wall 19 does not get an extremly high temperature, and as a consequence thereof the plates 20, 21 gets a temperature only a few degrees above the average temperature in the room. The air passing through the channel 18 between the wall 19 and the plates 20, 21 depends upon the temperature of the wall 19. A warmer wall 19 causes a more effective air stream which in itself causes a more effective cooling of the wall 19. This fact makes it possible to achieve almost an automatically operated adjustment of the temperature of the plates 20, 21. By an arrangement with the heating apparatus in a housing described above, it is possible to place such a heating apparatus and its housing in a cupboard, closet or the like. This is very important especially when a lack of place exists.

FIG. 4 shows a protection hood or cowl for the upper part of the tubes 3 and 4. This hood and/or the discs arranged inside it is adjustable in the manner described with reference to the device according to FIG. 2.

The hood 41 is secured to a roof 43 by a number of screws 42 or the like. This roof 43 may be a deck of a ship or the like. In case the roof 43 slopes it is advisable to use spacing means 42a in connection with some of the screws 42 in order to adjust the hood into a horizontal position. The hood 41 is shaped as a frustum of a cone with a plurality of recesses 41a, 41b. The recesses 41a are arranged adjacent the opening 3a and intended for fresh air and the recesses 41b are arranged adjacent the opening 4a and intended for exhausting gases. The upper part of the hood is covered by a plate 41c.

The hood 41 is shaped to cover the openings 4a of the tube 4, intended for exhausting gases, and the opening 3a of the tube 3 intended for fresh air. The tube 3, intended for fresh air, is surrounded by a flange 46, which may be connected or fastened to the tube 3 by a plurality of screws 46a. Onto the upper part of the flange 46 is secured a plurality of spacing means 47, which partly carry a disc 48 partly a disc 49. By loosening the screws 46a on the flange 46 the spacing means 47 together with the discs 48 and 49 may be moved parallel to an central axis of the tube 3. Thus the distance $Hi$ between the opening 3a of the tube 3 intended for the fresh air and the disc 48 and the distance between the opening 4a of the tube 4 intended for the exhausting gases and the disc 49 may be varied. It is advisable to let the disc 49 cooperate with each distance mean 47 over a screw 49a, which will be illustrated in FIG. 4b. This makes possible to arrange spacing devices between the disc 49 and the distance mean 47 in order to regulate or choose the distance mean 47 in order to regulate or choose the distance $Hu$ between the opening 4a of the tube 4 and the disc 49 independently of the distance $Hi$. It is essentially that the disc 49 is arranged adjacent the upper part of the recesses 41b.

FIG. 5 shows another preferred embodiment of a hood or cowl in which tube 3 is surrounded by a flange 56. This flange 56 has a radially extending part 58a, intended to prevent water flow into the tube 3. A plate 58 constitutes the distance $Hi$ and is secured to the hood 51 but carries another flange 57 surrounding the tube 4. Even this flange 57 has a radially extending part 59a intended to prevent water to flow into the tube 4. The recesses 51b have their upper edges adjacent a plate 59 secured to the upper part of the hood 51. It is of course essential that the upper part of the recesses 51b be adjacent the plate 59. Even if it is not necessary, the upper part of the recesses 51a may be placed adjacent the plate 58.

The flange 56 and its radially extending part 58a as well as the flange 57 and its radially extending part 59a may each be replaced by a circular ring arranged to surround the opening of the tube. Said ring may be movable along the central axis of the tube 3 in order to make an adjustment of the air inlet or the distance Hi. A corresponding ring may be arranged to surround the opening of the tube 4 in order to adjust the outlet of the exhausting gases or the distance Hu.

In the two embodiments shown in FIGS. 4 and 5 it is obvious that the distances Hi and Hu may be changed by placing different distance means 42a, 52a under the hood at the places where said hood is secured to the floor by screws 42, 52.

What I claim is:

1. A heating device comprising, a housing defining a combustion chamber to which is connected an outlet pipe for exhaust gases and an inlet pipe for fresh air, one of the pipes being of smaller diameter than the other, and the innermost of the two pipes having an upper end projecting above the upper end of the other pipe, a first disk located above and spaced from the top of the innermost pipe, and a second disk located below the first disk and below the upper end of the innermost pipe, the latter disk being positioned above and spaced from the upper end of the outermost pipe, the two disks being united together in spaced-apart relation and are thus adjustable together and axially of the pipes to thereby bring the two disks simultaneously toward or away from the respective ends of the pipes while maintaining a fixed spaced relationship between said disks.

2. A heating device according to claim 1, wherein a third disk is arranged around the outermost of the two pipes, said third disk being adjustably secured to said pipe below the upper end of the pipe, said last-mentioned disk being connected to the first and second disks by struts which maintain the several disks in a predetermined spaced relation.

3. A heating apparatus according to claim 1, wherein the free ends of the pipes and the discs thereat are covered by a hood, said hood having a wall provided with openings which communicate with spacing between the discs and having other openings communicating with spacing below the discs.

4. A heating apparatus according to claim 1, wherein the outlet pipe is of smaller diameter that the inlet pipe so that the outlet pipe is the innermost of the two concentrically-arranged pipes, the outlet pipe having its upper end protruding out of and located above the upper open end of the inlet pipe, the disks being held in spaced horizontal positions by struts, a supporting disc secured to the inlet pipe near the upper end of said pipe for the support of the other disks, the outlet pipe having an inner sleeve extending downwardly within it and spaced from its inner wall surface, and a hood fitted over the upper ends of the pipes and the disks thereat, the hood having openings which respectively communicate with the spacing between the disks.

References Cited

UNITED STATES PATENTS

| | | | |
|---|---|---|---|
| 3,105,432 | 10/1963 | Chamberlain. | |
| 3,168,091 | 2/1965 | Jackson | 126—85 XR |
| 3,082,677 | 3/1963 | Pease | 126—307 XR |
| 3,211,079 | 10/1965 | Carlson | 126—85 XR |

FOREIGN PATENTS

| | | |
|---|---|---|
| 615,008 | 2/1961 | Canada. |
| 27,807 | 1913 | Great Britain. |

KENNETH W. SPRAGUE, Primary Examiner

U.S. Cl. X.R.

726—85